United States Patent [19]

Krukoski et al.

[11] Patent Number: 4,765,133

[45] Date of Patent: Aug. 23, 1988

[54] FUEL CONTROL WITH SMOOTH MODE TRANSITION

[75] Inventors: Leon Krukoski, Coventry; Richard F. Laprad, South Windsor, both of Conn.

[73] Assignee: United Technologies Corporation, Hartford, Conn.

[21] Appl. No.: 939,217

[22] Filed: Dec. 8, 1986

[51] Int. Cl.$^4$ ............................................. F02C 9/28
[52] U.S. Cl. .................................. 60/39.06; 60/39.281
[58] Field of Search ............... 60/39.03, 39.06, 39.281, 60/39.282

[56] References Cited

U.S. PATENT DOCUMENTS

| | | | |
|---|---|---|---|
| 2,809,492 | 10/1957 | Arkawy | 60/39.28 |
| 3,420,056 | 1/1969 | Eames | 60/39.28 |
| 4,058,975 | 11/1977 | Gilbert et al. | 60/39.28 |
| 4,122,667 | 10/1978 | Hosaka et al. | 60/39.09 |
| 4,212,161 | 7/1980 | Newirth et al. | 60/39.28 |
| 4,228,650 | 10/1980 | Camp | 60/39.281 |
| 4,423,594 | 1/1984 | Ellis | 60/39.281 |
| 4,543,782 | 10/1985 | Fitzmaurice | 60/39.281 |
| 4,581,888 | 4/1986 | Schmitzer et al. | 60/39.09 |

Primary Examiner—Louis J. Casaregola
Attorney, Agent, or Firm—Stephen E. Revis

[57] ABSTRACT

A gas turbine engine control system which regulates fuel flow based upon a schedule which is a function of a primary parameter, such as engine pressure ratio, switches to a schedule based upon a secondary parameter, such as compressor speed, upon the inability to function in the primary parameter mode. Upon switchover to the secondary parameter mode the scheduled value of the secondary parameter is down-trimmed to make it equivalent to the last known good value of the primary parameter so that the engine will not experience a sudden change in power level upon switchover. The down-trim is limited. When the primary mode failure occurs during a transient the down-trim is limited to the difference between a scheduled reference value of the secondary parameter and a value of the secondary parameter calculated immediately preceeding loss of the primary parameter mode and based upon a known relationship between the primary and secondary parameter. The down-trim limit assures a smooth transition from the primary to the secondary control mode when the switchover occurs during an engine transient.

9 Claims, 2 Drawing Sheets

FUEL CONTROL WITH SMOOTH MODE TRANSITION

TECHNICAL FIELD

1. Cross Reference to Related Applications

Commonly owned patent application Ser. No. 939,215 entitled *Engine Control With Smooth Transition to Synthesized Parameter* by Leon Krukoski et al., filed on even date with the present application, discloses and claims subject matter related to the subject matter of the present application.

This invention relates to fuel controls for gas turbine engines.

2. Background Art

Fuel controls for gas turbine engines operate in a closed loop fashion based on an engine parameter, such as engine pressure ratio (EPR) which is the ratio of the engine exhaust to engine inlet total pressure $P_5/P_2$. A desired or reference EPR is computed based upon throttle setting and prevailing atmospheric conditions and is compared to the actual EPR of the engine; fuel is modulated to drive the resultant error team to zero. A detected failure of any one of the signals necessary to compute either the reference EPR or the actual EPR forces operation of the control based upon an alternate control mode, such as the speed $N_1$ of the low compressor if the engine is a twin spool gas turbine engine. In that case, a reference $N_1$ ($N_{1ref}$) is computed based upon prevailing conditions and throttle setting. This is compared to the actual $N_1$ and fuel is modulated to drive the resultant error term to zero. Because the characteristics of these different references are different, there could be a sudden change in engine speed at the time of transfer. This is sometimes referred to as a "bump". Bumps, at a minimum, can be unsettling to the pilot and passengers of the aircraft. Furthermore, if they occur during transient engine operation they can be dangerous, such as when the pilot suddenly calls for full power, and the engine does not respond in the manner expected.

In the PW2037 twin spool engine manufactured by the Pratt & Whitney Division of United Technologies Corporation, it is known to eliminate bumps when a control mode change occurs by attempting to force the new reference parameter to match the failed reference parameter at the instant of failure. More specifically, if EPR is the primary mode and $N_1$ is the backup mode, it is known to continuously monitor $N_1$ during EPR operation and to use the last value thereof prior to EPR failure to trim the reference speed schedule such that $N_{1ref}$ (trimmed) equals the last measured value of $N_1$ at the instant of EPR failure. If the desired $N_1$ just after EPR failure (i.e. trimmed $N_{1ref}$) is almost the same as $N_1$ just before the failure, the bump is virtually eliminated. This will be the case when EPR fails during steady state engine operation or at low rates of acceleration or deceleration; however, if EPR failure occurs near the onset of a significant engine transient the bump will not be eliminated as a result of the great difference between the engine speed at the time of EPR failure and the desired engine speed ($N_{1ref}$) based upon EPR at the new throttle setting at the time of EPR failure. The fault logic will therefore overcompensate and the result may be a severe loss of engine thrust.

DISCLOSURE OF THE INVENTION

One object of the present invention is a fuel control for a gas turbine engine which can transfer from operation based upon a first engine parameter to operation based on a different engine parameter with minimum effect on engine operation at the time of switchover.

Another object of the present invention is a fuel control for a gas turbine engine which transfers from one mode of operation to another mode of operation with minimal effect on engine operation at the time of switchover, even if switchover occurs in the midst of an engine acceleration or deceleration.

According to the present invention, in a gas turbine engine control system which regulates fuel flow on the basis of a primary parameter schedule and switches to a secondary parameter schedule upon the inability to reliably determine the primary parameter, the control continuously calculates the value of the secondary parameter at which it would be desired to operate the engine based upon a known relationship between the primary and secondary parameter, and the difference between a scheduled value of the secondary parameter and such calculated value of the secondary parameter immediately preceeding loss of the first parameter is used to limit the down-trim of the scheduled value of the secondary parameter upon loss of the primary parameter.

With this control technique the down-trim limit is always calculated using an estimate of the desired value of the second parameter at the new throttle setting based upon the primary parameter schedule. If primary parameter failure occurs during a transient, this estimated value may be considerably different from the actual value of the secondary parameter at the instant of primary parameter failure, (particularly if the secondary parameter changes relatively slowly during transients) and will be much closer to the value of the secondary parameter which the new throttle setting would have called for had the primary parameter not been lost.

In a preferred embodiment the primary parameter is EPR and the secondary parameter is engine speed. When EPR failure occurs the control switches to an engine speed schedule to control the fuel flow. The speed schedule is not identical to the EPR schedule and, if not corrected, would result in a sudden engine speed change upon switchover, even without throttle movement. In the control of the present invention the speed schedule is trimmed upon EPR failure by an amount equal to the difference between the scheduled and actual value of engine speed just prior to EPR failure to compensate for the difference between the EPR and speed schedules at the current throttle setting. The same engine speed will therefore be called for by the control at the instant the operating mode is switched. This trim amount is limited by a trim value which is calculated using an estimate of the desired engine speed at the current throttle setting based upon the EPR schedule in use prior to EPR failure, rather than being calculated using the actual engine speed at the time of EPR failure. This is done because the actual engine speed in the midst of a transient might be much lower than the speed which the EPR schedule would have called for at the new throttle setting. Without this limit the result could be excessive trim when EPR failure occurs during a transient.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
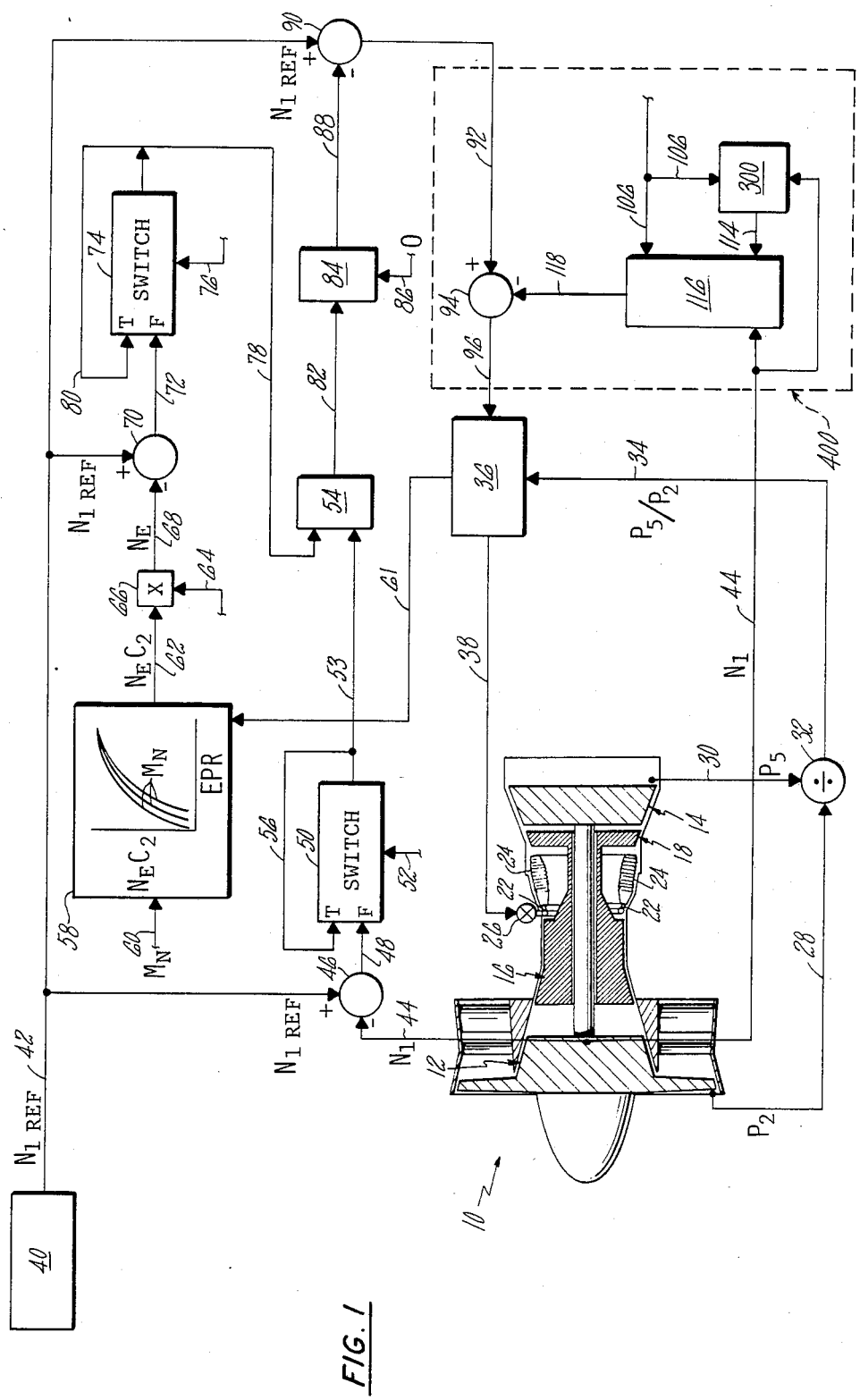
FIG. 1 is a schematic and block diagram of a twin spool gas turbine engine incorporating the control system of the present invention.

As an exemplary embodiment of the present invention, consider the twin spool turbofan gas turbine engine shown in the drawing and generally represented by the reference numeral 10. The engine comprises a low pressure compressor 12 connected through a shaft to a low pressure turbine 14; a high compressor 16 connected through a shaft to a high turbine 18; and a burner section 20 disposed between the high compressor and the high turbine. A plurality of fuel nozzles 22 spray fuel into the burners 24 of the burner section 20. Fuel flow rate into the nozzles 22 is varied by a valve 26.

An electronic engine control automatically regulates engine operation, such as fuel flow rate, based upon pilot demand (throttle setting), various aircraft and engine parameters and scientific and empirically developed relationships between various parameters. In this embodiment the electronic engine control's primary mode of fuel flow control is based upon engine total pressure ratio (EPR), which is the ratio of the engine outlet pressure ($P_5$) to the engine inlet pressure ($P_2$). As shown in the drawing, a signal 28 indicative of the inlet pressure and a signal 30 indicative of the outlet pressure are delivered to a divider 32. The output signal 34 from the divider is the engine pressure ratio, which signal is delivered to a portion of the fuel control designated by the box 36. Within the control portion 36 is a schedule of engine pressure ratios against which the actual pressure ratio is compared. The control portion 36 sends a signal 38 to the fuel nozzle valve 26 to adjust the fuel flow, and thereby the engine speed, until the actual engine pressure ratio matches the scheduled engine pressure ratio for the particular throttle setting.

If either the primary fuel control parameter, engine pressure ratio, or the engine pressure ratio schedules become unavailable or unreliable (hereinafter either occurrence is referred to as an EPR mode failure), the control portion 36 switches to a secondary parameter, low pressure compressor speed $N_1$, to control the fuel flow. With reference to the drawing, a control portion 40 continuously produces an output signal 42 indicative of a scheduled low pressure compressor reference speed $N_{1ref}$. This reference speed is the maximum speed that the engine can tolerate under existing conditions and throttle setting. A signal 44 indicative of the actual low pressure compressor speed $N_1$ is subtracted from $N_{1ref}$ in a subtractor 46; and a signal 48 indicative of that difference is delivered to a switch 50. Of course, while the engine is still being controlled based upon EPR, $N_1$ will be a value which is a function of EPR in accordance with the EPR schedule built into the control.

A signal 52 is delivered to the switch 50 when an EPR mode failure occurs. When no signal 52 is present the output 53 of the switch 50 is the presently calculated value of the signal 48, which is sent to a select-low gate 54. When the switch 50 receives the signal 52, its output 53 is a signal 56 which is indicative of the value of the signal 48 last calculated prior to the switch receiving the signal 52; and that value of the signal 48 is thereafter continuously delivered to the select low gate 54.

A function generator 58 continuously receives a signal 60 indicative of the aircraft Mach number $M_n$ and a signal 61 from the control portion 36 indicative of the scheduled engine pressure ratio. Based upon these inputs the function generator 58 generates a signal 62 ($N_E C_2$) indicative of the low pressure compressor speed corrected to the temperature at the low pressure compressor inlet. In a manner well known in the art, the corrected low compressor speed 62 and an appropriate multiplier 64 (a function of temperature at the low compressor inlet) are delivered into a multiplier 66 to yield a signal 68 indicative of an estimated value of the low rotor speed ($N_E$). The estimated low pressure compressor speed signal 68 is subtracted from $N_{1ref}$ in a subtractor 70 and a signal 72 indicative of that difference is delivered to a switch 74.

A signal 76 is delivered to a switch 74 when an EPR mode failure occurs. When there is no signal 76 the switch 74 passes the presently calculated value of the signal 72. Upon receiving the signal 76 the output 78 of the switch 74 has the value of a signal 80 which is indicative of the value of the signal 72 last calculated prior to the switch 74 receiving the signal 76. The value of the signal 78 therefore represents the difference between $N_{1ref}$ and an estimated low rotor speed based upon an engine pressure ratio schedule and the current engine throttle setting, and not based upon the current low pressure compressor speed $N_1$. If the engine pressure ratio or engine pressure ratio schedules become unavailable or unreliable immediately after the throttle has been moved and before the engine has had an opportunity to change from its old speed to its new speed, the signal 68, which is the estimated compressor speed $N_E$, will be approximately the speed normally called for by the engine pressure ratio schedule at the new throttle setting. In contrast, the speed signal 44 will be the actual engine speed at the time of EPR mode failure, which may be considerably different from the desired speed based upon the throttle setting and the EPR schedule.

The speed difference signals 78 and 53 are both fed to the select-low gate 54, and the lower of the two signals, represented by the output signal 82, is passed to a select-high gate 84. The high gate 84 receives the signal 82 as well as a signal 86. The signal 86 is always zero. Thus, if the signal 82 is negative, the output signal 88 from the high gate 84 will be zero; otherwise it will be identical to the signal 82. The high gate 84 is used to assure that the value of the signal 88 (the $N_{1ref}$ trim) is never negative, which could happen when the EPR mode failure occurs during a deceleration. A negative value for the signal 88 would result in a value of the signal 92 which is higher than $N_{1ref}$, which cannot be allowed since $N_{1ref}$ is the maximum low pressure compressor speed which the engine can safely tolerate. Thus, only a down-trim is applied to $N_{1ref}$.

The value of the signal 88 is subtracted from $N_{1ref}$ in a subtractor 90, and a signal 92 indicative of the difference is delivered to a subtractor 94 along with a signal 118 from a switch 116. The signal 118 will have the value of either the current actual engine low pressure compressor speed signal 44 or, if the signal 44 ($N_1$) is unavailble or unreliable, will have a synthesized value of $N_1$. An error signal 96 indicative of the difference between the actual or synthesized engine speed and the desired engine speed represented by the signal 92 is delivered into the control portion 36. When either the engine pressure ratio signal 34 or the EPR schedules within the control portion 36 is unavailable or unreliable the control portion 36 controls the fuel flow via the valve 26 to reduce the error signal 96 to zero.

To avoid a "bump" during steady state it is necessary that the trim limiting mechanism of the control system not influence the trim operation when EPR mode failure occurs during steady state engine operation. This will be assured if the value of the signal 68 is always less than the value of the compressor speed which would have been called for by the throttle setting in the EPR mode. The Mach number curves used in the function generator 58 are therefore selected to assure that $N_E$ will never be greater than and will preferably be slightly less than the speed called for by the EPR schedule at the time of EPR failure.

Although the primary parameter in this embodiment is the engine pressure ratio, it is apparent the present invention may be used with a primary parameter other than EPR (e.g. fan pressure ratio or a weighted fan/engine pressure ratio).

In the event of failure of certain parameters required by a control system to operate an engine it is known to calculate a synthesized value of the failed parameter to be used in place of the actual measured parameter. For example, burner pressure is synthesized in commonly owned U.S. Pat. No. 4,212,161 to David M. Newirth et al. Although not claimed herein and not required by the control system of FIG. 1 as described up to this point, as an additional back-up to the system it is desireable to calculate a synthesized value of $N_1$ (hereinafter referred to as $N_{1syn}$) to be used in the event of unavailability or unreliability of an actual measured value of $N_1$. This is accomplished in the synthesis calculator 300 shown in detail in FIG. 2, which shows that portion of the control system of FIG. 1 encompassed by the phantom line 400.

Figure 2:
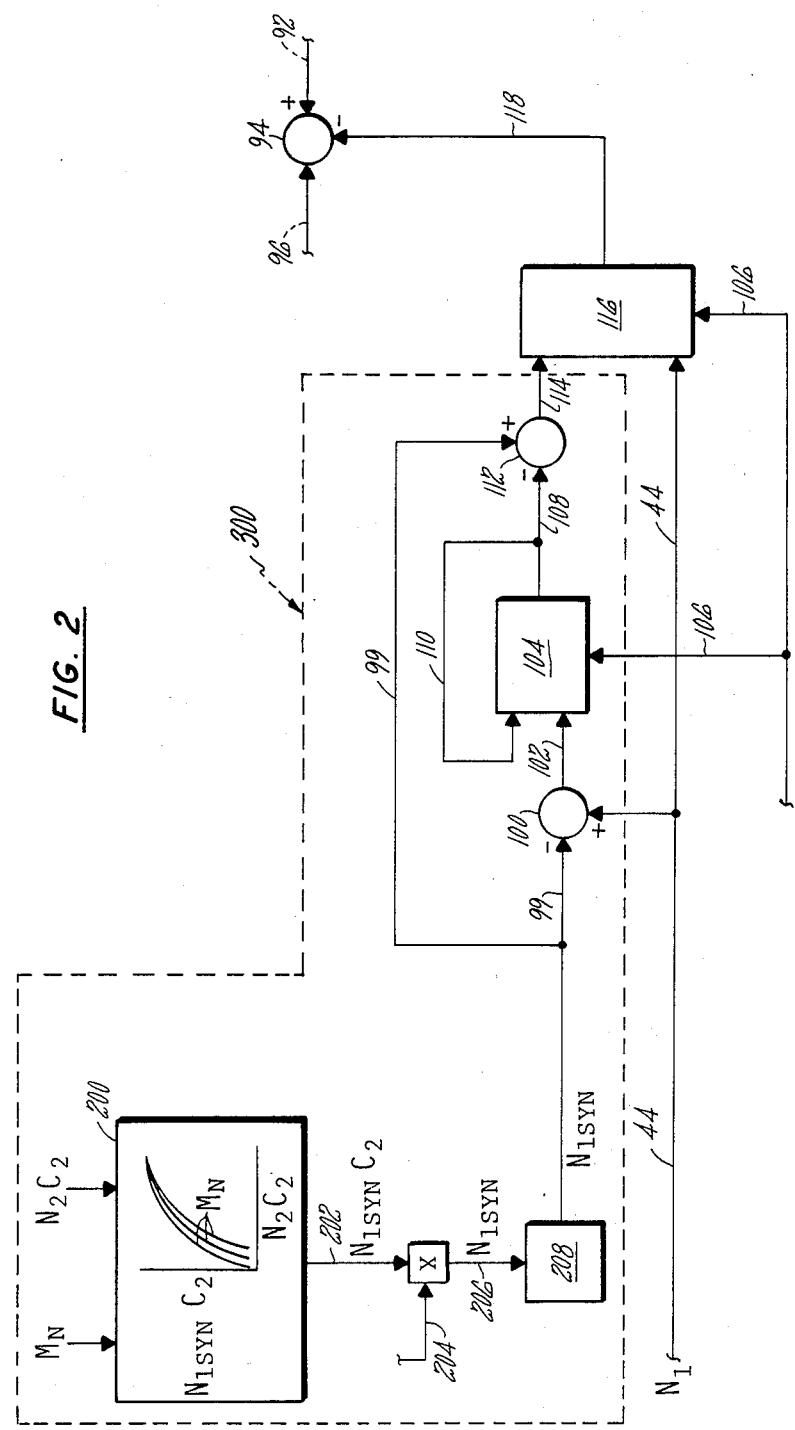
FIG. 2 is a schematic and block diagram showing an aspect of the control system of FIG. 1 in more detail.

As with the sudden switchover to a different control mode, the switch from an actual to a synthesized parameter can result in a "bump". The control logic of FIG. 2 eliminates such a bump. In the embodiment of FIG. 2 the parameter which is synthesized is $N_1$. A synthesized value of $N_1$ is continuously calculated from the most recent, valid information such that it is always up to date and ready for use upon the actual value of $N_1$ becoming unavailable or unreliable (i.e., $N_1$ failure). Referring to the drawing, aircraft Mach number and the high pressure compressor speed corrected to the temperature at the low pressure compressor inlet ($N_2C_2$) are input to a function generator 200. The function generator 200 produces an output 202 which is an estimated value of the low pressure compressor speed corrected to the temperature at the low compressor inlet ($N_{1syn}C_2$). The value of the signal 202 is based upon empirically derived relationships between Mach number and corrected high compressor speed which, in turn, are based upon steady state engine characteristics.

In a manner well known in the art, the corrected, estimated corrected low pressure compressor speed 202 and an appropriate multiplier 204 (which would be the same as the multiplier 64 of FIG. 1) are delivered into a multiplier 205 to yield a signal 206 indicative of an estimated or synthesized value of the low rotor speed ($N_{1syn}$). Since the value of $N_{1syn}$ is based upon empirical relationships between the high and low rotor during steady state engine operation, the signal 206 is passed through a compensator 208 which replaces the dynamic characteristics of the corrected high pressure compressor speed $N_2C_2$ with that of the output $N_{1syn}C_2$ during transient operation. During steady state operation the compensator will have no effect. Compensators of this nature are well known in the art.

The $N_{1syn}$ output signal 99 from the compensator 208, along with the signal 44 indicative of the actual measured value of $N_1$ are continuously fed to a subtractor 100. A signal 102 representing the difference between them is fed to a switch 104, along with a signal 106 indicating whether or not $N_1$ has failed (i.e., is unavailable or unreliable).

If the signal 106 indicates $N_1$ is good, the output 108 of the switch 104 will simply be the current calculated difference between $N_1$ and $N_{1syn}$. If the signal 106 indicates $N_1$ is not good, the output 108 will be the value of the signal 110, which is the last value of the difference between $N_1$ and $N_{1syn}$ calculated before the failure signal was received by the switch. In either event, the switch output 108 is sent to a subtractor 112, along with the $N_{1syn}$ signal 99, and the output signal 114 therefrom is sent to the switch 116, along with the signal 44 indicative of the actual measured value of $N_1$.

The fault signal 106 is delivered to the switch 116. If the signal 106 indicates $N_1$ is still good, then the $N_1$ signal 44 is passed therethrough as the switch output signal 118. If $N_1$ is bad, the signal 118 will have the value of the signal 114, which is an estimated value of $N_1$.

It can be seen that at the instant of $N_1$ failure (i.e. upon switchover to the use of $N_{1syn}$) the value of the output 114, and thus the value of the signal 118, will be the last good value of $N_1$ measured essentially at the instant before failure. Thereafter, the value of output 114 will increase and decrease incrementally by an amount equal to the change in the calculated value of $N_{1syn}$. Thus, the control produces no bump at the instant of switchover and continues to control the engine smoothly as a function of $N_{1syn}$.

It should be apparent that the foregoing method for eliminating a bump upon switchover from actual engine speed to synthesized engine speed may be used to eliminate a bump in switching from the use of any measured parameter to the use of a synthesized value of that parameter.

Additionally, it should be understood by those skilled in the art that other various changes and omissions in the form and detail of the invention may be made without departing from the spirit and scope thereof.

We claim:

1. In the method of operation of a control system for a gas turbine aircraft engine having a compressor, a burner, and a turbine, wherein the actual value of a first parameter is continuously determined, and wherein a scheduled value of the first parameter is compared to the actual value of the first parameter, and the control modulates the fuel flow to the burner to eliminate any difference between the actual and scheduled values of the first parameter, and in the event either the scheduled or actual values of the first parameter cannot be reliably determined and the first parameter is thereby lost, and the control modulates fuel flow to eliminate the difference between a scheduled value of a second parameter, which is compressor speed, and the actual value of the compressor speed to eliminate the difference therebetween, and wherein a trim for the scheduled value of the compressor speed is computed and applied to the scheduled value of the compressor speed upon loss of the first parameter, the trim begin computed as the difference between said scheduled value of the compressor speed and the actual value of the compressor speed last determined before first parameter mode loss, the improvement comprising the steps of:

continuously estimating the value of the compressor speed as a function of the scheduled value of the first parameter;

continuously calculating the difference between the scheduled value of the compressor speed and said estimated value of the compressor speed; and upon first parameter mode loss, limiting the computed trim applied to the scheduled value of the compressor speed to the continuously calculated difference last calculated in said preceding step prior to loss of said first parameter.

2. The improvement according to claim 1 wherein engine pressure ratio is the first parameter, and the step of continuously estimating compressor speed includes estimating compressor speed as a function of the scheduled value of engine pressure ratio.

3. The improvement according to claim 2 wherein said step of continuously estimating compressor speed includes estimating compressor speed as a function of scheduled engine pressure ratio and aircraft Mach number.

4. The improvement according to claim 1 wherein the engine is a twin spool turbofan engine, and said second parameter is low pressure compressor speed.

5. The improvement according to claim 1 wherein said continuously calculated difference is no less than the difference between the scheduled value of the compressor speed and the compressor speed which would be called for during the first parameter mode.

6. In a control system for a gas turbine aircraft engine having a compressor, a burner, a turbine and means for continuously measuring the actual value of a first parameter, said control system including means for comparing the actual value of the first parameter to the scheduled value of a first parameter; means for generating a first signal when the scheduled or actual value of the first parameter cannot be reliably determined, the first parameter thereby being lost; means for continuously modulating the fuel flow to the burner to eliminate any difference between the actual and scheduled value of the first parameter prior to the first signal being generated; and means for computing a first trim as the difference between the scheduled value of the compressor speed and the actual value of the compressor speed last determined before a loss of the first parameter, the improvement comprising:

means for determining a trim limit including (1) means for receiving the first signal; (2) means for continuously estimating the value of the compressor speed as a function of the scheduled value of the first parameter; (3) calculating means for continuously calculating a trim limit as the difference between the scheduled value of the compressor speed and the estimated value of the compressor speed; and (4) means for generating a second signal upon receipt of the first signal, the second signal being indicative of the trim limit last calculated by said calculating means prior to receiving the first signal; and means for selecting the lower of the first trim and the trim limit, and for applying the selected trim to the scheduled value of the compressor speed after the first signal is received;

wherein said modulating means includes means for modulating the fuel flow to the burner to eliminate any difference between the actual value and trimmed value of the scheduled compressor speed after the first signal is received.

7. The improved control system according to claim 6 wherein the first parameter is engine pressure ratio.

8. The improved control system according to claim 7 wherein said estimating means includes means for continuously estimating the value of the compressor speed as a function of both the scheduled value of the engine pressure ratio and the value of the aircraft Mach number.

9. The improved control system according to claim 7, wherein said control system is for a twin spool turbofan engine having a low pressure compressor and a high pressure compressor, and the second parameter is low pressure compressor speed.

* * * * *